(12) United States Patent
Raji et al.

(10) Patent No.: US 7,627,317 B2
(45) Date of Patent: Dec. 1, 2009

(54) METHOD FOR THE TRANSMISSION OF DATA PACKETS IN A MOBILE RADIO SYSTEM AND CORRESPONDING MOBILE RADIO SYSTEM

(75) Inventors: Faiba Raji, Vienna (AT); Frank Wegner, Berlin (DE)

(73) Assignee: Siemens Akiengesellschaft, Munich (DE)

( * ) Notice: Subject to any disclaimer, the term of this patent is extended or adjusted under 35 U.S.C. 154(b) by 425 days.

(21) Appl. No.: 10/493,112

(22) PCT Filed: Jun. 17, 2003

(86) PCT No.: PCT/EP03/06394

§ 371 (c)(1),
(2), (4) Date: Sep. 30, 2004

(87) PCT Pub. No.: WO2004/006515

PCT Pub. Date: Jan. 15, 2004

(65) Prior Publication Data

US 2005/0105488 A1    May 19, 2005

(30) Foreign Application Priority Data

Jul. 5, 2002    (DE) ................................ 102 30 400
Jul. 5, 2002    (EP) ................................ 02015083

(51) Int. Cl.
*H04W 36/00* (2009.01)
*H04W 4/00* (2009.01)

(52) U.S. Cl. ....................... 455/436; 455/438; 455/437; 455/432.1

(58) Field of Classification Search ................. 455/436, 455/438, 432, 437; 370/331
See application file for complete search history.

(56) References Cited

U.S. PATENT DOCUMENTS

| 5,761,619 | A  | * | 6/1998 | Danne et al. | ............. 455/422.1 |
| 5,940,371 | A  | * | 8/1999 | Mitts et al. | ................. 370/236 |
| 2001/0012279 | A1 | * | 8/2001 | Haumont et al. | ............ 370/331 |
| 2002/0065064 | A1 | * | 5/2002 | Griffith et al. | ................ 455/405 |

FOREIGN PATENT DOCUMENTS

| DE | 10017062 A1 | 5/2001 |
| EP | 0695053 A2 | 1/1996 |
| EP | 0777396 A1 | 6/1997 |
| EP | 1124398 A1 | 8/2001 |
| EP | 1178627 A1 | 2/2002 |
| WO | WO02/03626 A2 | 1/2002 |
| WO | WO03/026326 A1 | 3/2003 |

OTHER PUBLICATIONS

"Fast Cell Selection and Handovers in HSDPA", R2-A010017, TSG-RAN Working Group 2 meeting #18, Edinburgh, UK, Jan. 15-19, 2000.

* cited by examiner

*Primary Examiner*—Nick Corsaro
*Assistant Examiner*—Shannon R Brooks
(74) *Attorney, Agent, or Firm*—Staas & Halsey LLP

(57) ABSTRACT

A method transmits data packets in a mobile radio system and corresponding mobile radio system. The method permits an immediate transmission of data packets to the receiver station along a new transmission path, after a handover of a connection along a transmission path, between a transmission station and a receiver station, to a new transmitting station. The new transmission station thus receives no information regarding the transmission status of data packets, which were transmitted before the handover of the connection.

31 Claims, 8 Drawing Sheets

FIG 3

RNC

| RS | | |
|---|---|---|
| new | sent | retrans |
| | | |
| | | |
| 9 | | |
| 8 | 4 | |
| 7 | 3 | |
| 6 | 2 | |
| 5 | 1 | |

B1

| BS | | |
|---|---|---|
| new | sent | retrans |
| | | |
| | | |
| | | |
| | | |
| | 3 | |
| | 2 | |
| 4 | 1 | |

UE

| US | |
|---|---|
| ACK | NACK |
| | |
| | |
| | |
| | |
| | |
| 3 | |
| 1 | 2 |

FIG 4

| RNC | | |
|---|---|---|
| RS | | |
| new | sent | retrans |
|  |  |  |
|  |  |  |
| 9 |  |  |
| 8 | 4 |  |
| 7 | 3 |  |
| 6 | 2 |  |
| 5 | 1 |  |

| B1 | | |
|---|---|---|
| BS | | |
| new | sent | retrans |
|  |  |  |
|  |  |  |
|  |  |  |
|  |  |  |
|  |  |  |
|  |  |  |
| 4 |  | 2 |

| UE | |
|---|---|
| US | |
| ACK | NACK |
|  |  |
|  |  |
|  |  |
|  |  |
|  |  |
|  |  |
|  | 2 |

FIG 5

RNC

| RS | | |
|---|---|---|
| new | sent | retrans |
|  | 7 |  |
|  | 6 |  |
|  | 5 |  |
|  | 4 |  |
|  | 3 |  |
| 9 | 2 |  |
| 8 | 1 |  |

B1

| BS | | |
|---|---|---|
| new | sent | retrans |
|  |  |  |
|  |  |  |
|  |  |  |
|  |  |  |
|  |  |  |
|  |  |  |
| 4 |  | 2 |

B2

| BS | | |
|---|---|---|
| new | sent | retrans |
|  |  |  |
|  |  |  |
|  |  |  |
| 7 |  |  |
| 6 |  |  |
| 5 |  |  |
| ? (4) | ? | ? |

UE

| US | |
|---|---|
| ACK | NACK |
|  |  |
|  |  |
|  |  |
|  |  |
|  |  |
|  | 2 |

FIG 7

| RNC | | |
|---|---|---|
| RS | | |
| new | sent | retrans |
|  |  |  |
|  |  |  |
|  |  |  |
|  |  |  |
| 12 | 7 |  |
| 11 | 6 |  |
| 10 | 5 |  |

| B2 | | |
|---|---|---|
| BS | | |
| new | sent | retrans |
|  |  |  |
|  |  |  |
|  |  |  |
|  |  |  |
| 9 |  |  |
| 8 | 7 | 6 |
| 4 | 5 | 2 |

| UE | |
|---|---|
| US | |
| ACK | NACK |
|  |  |
|  |  |
|  |  |
|  |  |
|  |  |
|  | 6 |
|  | 2 |

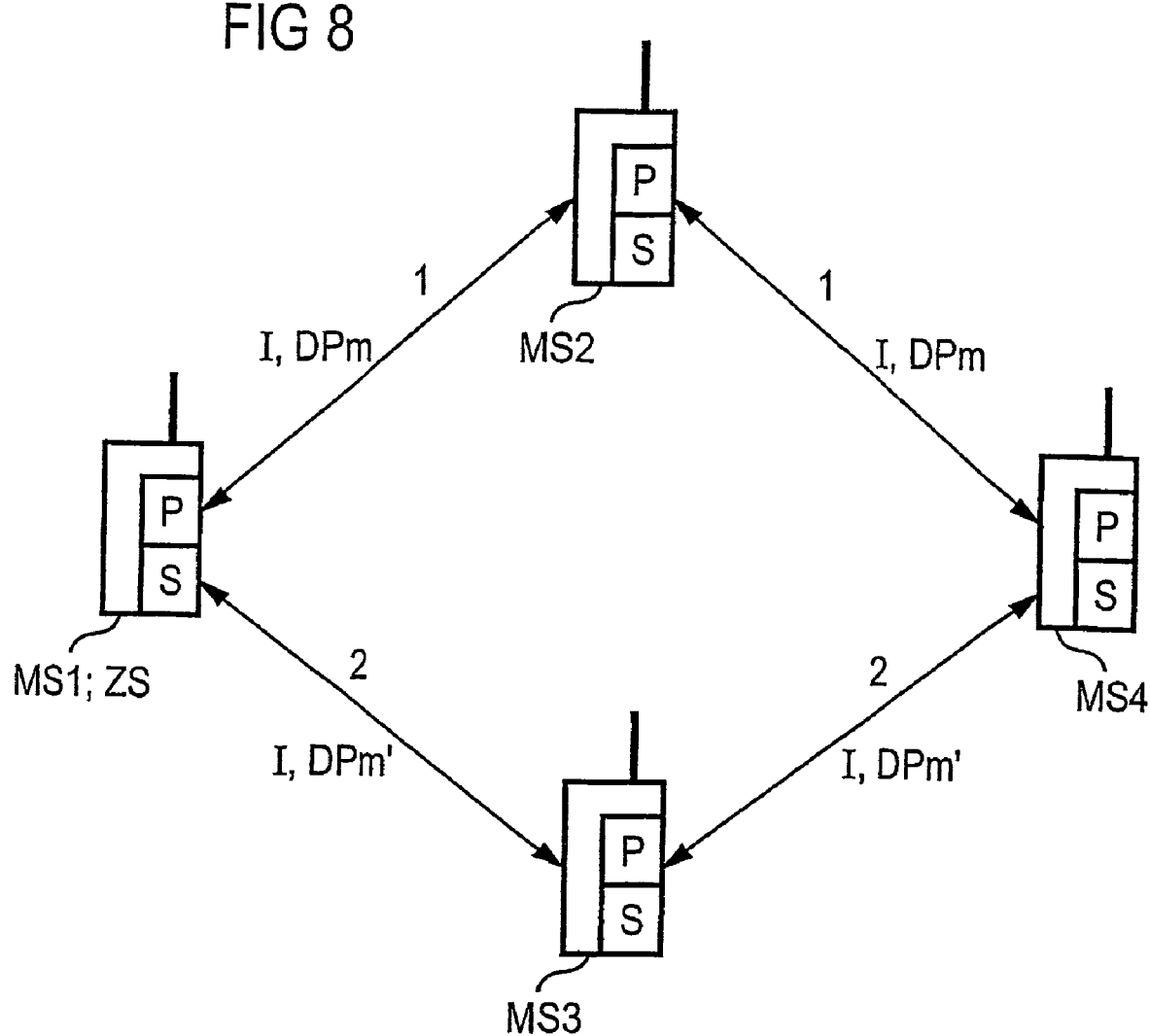

METHOD FOR THE TRANSMISSION OF DATA PACKETS IN A MOBILE RADIO SYSTEM AND CORRESPONDING MOBILE RADIO SYSTEM

CROSS REFERENCE TO RELATED APPLICATIONS

This application is based on and hereby claims priority to PCT Application No. PCT/EP2003/006394 filed on Jun. 17, 2003, German Application No. 102 30 400.9 filed on Jul. 5, 2002 and European Application No. 02015083.5 filed on Jul. 5, 2002, the contents of which are hereby incorporated by reference.

BACKGROUND OF THE INVENTION

The invention relates to a method for the transmission of data packets in a mobile radio system, and a corresponding mobile radio system.

In mobile radio systems such as GSM (Global System for Mobile communications) and UMTS (Universal Mobile Telecommunications System) data and data packets are transmitted from the fixed network by transmission stations to receiver stations by way of an air interface. FIG. 1 shows a known UMTS in schematic and simplified form. The fixed network CN is connected by data lines Iu to the UTRAN (Universal Terrestrial Radio Access Network). The UTRAN comprises a plurality of subsystems RNS (Radio Network Subsystem) which each have a data line Iu to the fixed network CN. Always connected to each data line Iu is a controller RNC (Radio Network Controller) which is in turn connected by connections Iub to a plurality of base stations B. A plurality of cells of the mobile radio system can be assigned to each base station B (e.g. by way of sector antennas). The interface between UTRAN and the user equipment UE which is referred to in GSM as a mobile station is implemented by way of the interface Uu by a radio link. The controllers RNC of different subsystems RNS are as a rule connected by a further interface Iur. This further interface Iur is required for a so-called handover (switch of cell), amongst other things.

During a soft handover, the user equipment UE is simultaneously connected to at least two base stations B which are each capable of being assigned to different controllers RNC. Since only one connection Iu is required in order to exchange data between user equipment UE and fixed network CN, the data flow is controlled by only one controller RNC, called SRNC (Serving RNC). If the two base stations B are to be assigned to different controllers RNC, only one of the controllers RNC is the SRNC, while the second controller is referred to as the DRNC (Drift RNC). The controller known as DRNC handles its data transmission to and from the fixed network CN by way of the further interface Iur and thus by way of the controller SRNC.

In each controller RNC, a connection check RLC (Radio Link Control) is performed with the aid of a storage facility RS in which, apart from the data packets, information is stored concerning which data has been sent, is to be sent again, or is yet to be sent. In the case of a soft handover, this data transmission status information is however stored only in the controller SRNC. The user equipment UE also has a similar storage facility US for status information and data packets, which stores information about which data it has successfully decoded and for which data it is requesting a re-transmission. In the event of successful decoding of the data, the user equipment UE sends a confirmation ACK (acknowledge) to the radio link control RLC facility for the relevant controller RNC. If the decoding is not successful, a NACK (non acknowledge) is sent instead.

Whereas during the soft handover a connection exists simultaneously between the user equipment UE and at least two base stations B, during the hard handover the connection is only transferred from one base station B to another base station B if the connection to the first base station B has been previously terminated. Just as in the case of the soft handover, this connection handover can take place both between base stations B of one and the same controller RNC and also between base stations B of different controllers RNC. Following a hard handover, however, a synchronization of the stored data transmission status information must take place between the user equipment UE and the relevant controller RNC and, where necessary, the storage contents of the old controller RNC must be transmitted to the new controller RNC. This synchronization of the data transmission status information takes time and delays the resumption of data transmission following a hard handover. High data transfer rates cannot therefore be achieved in this manner.

The same holds true in respect of the data transfer rate in the case of a fast selection of the radio cell with which the user equipment UE wishes to operate a connection. The user equipment UE has a set of radio cells for possible selection by way of which it can route the connection to the fixed network CN. The user equipment UE then determines the radio cell having the best properties and signals in the uplink direction the cell from which it wishes to be supplied. This principle is referred to as Fast Cell Selection (FCS). If the chosen cell changes during a connection, then the same problem occurs with FCS as in the case of a hard handover. The synchronization of the stored data transmission status information must also take place for FCS as described in the previous paragraph. High data transfer rates are not therefore possible in this manner even in the case of FCS.

Future mobile communication systems will however require, and need to support, high data transfer rates. One example of this is High Speed Downlink Packet Access (HSDPA) which is currently under discussion by the 3rd Generation Partnership Project (3GPP) for UTRA FDD and TDD (Universal Terrestrial Radio Access Frequency Division Duplex and Time Division Duplex). In order to achieve high data transfer rates, control of the data transmission is shifted from the controller RNC into the base stations B, in other words in the base stations B additional storage facilities BS are set up which store the data packets and the data transmission status information. Time savings are achieved in this way since the transmission path between the controller RNC and the base stations B is dispensed with during control of the data transmission. Even when this new storage facility BS is included in the base stations B the hard handover takes place as described previously. Proposals on this topic may be found for example in a paper presented by Motorola on the occasion of the TSG-RAN Working Group 2 meeting #18/00 in Edinburgh, 15 to 19 Jan. 2000, under the title "Fast Cell Selection and Handovers in HSDPA" (R2-A010017). As explained above, the data transmission is resumed when the new base station B has been informed of the status of the data transmission, in other words when the storage contents of the old base station B have been sent to the new base station B. This synchronization of the data transmission status information between old and new base station B takes place in this situation either by way of the connections Iub on the controller RNC and if applicable also by way of the further interface Iur and/or by the user equipment UE by way of the radio interface. The limits for HSDPA are thus given as a result of the finite time which is required for transmission of the storage contents of the old base station B (data packets and transmission status of the data packets) to the storage facility BS of the new base station B.

A handover from an old base station to a new base station for a cellular computer device is described in EP0695053A. The protocol status for the data transmission is notified to the new base station either by appropriate information from the cellular computer device, information from the old base station or a combination of information from both sources during the handover.

A method for operating a mobile radio network is described in DE 100 17 062 A1, whereby in the case of a switch of connection for a mobile station from a first base station to a second base station transmission-specific information is transmitted from a first higher-level network unit to a second higher-level network unit in order to resume a transmission of data units to the mobile station after the switch in connection from the current status.

SUMMARY OF THE INVENTION

One possible object of the invention is therefore to set down a method which in the event of a change of cell assigned to the user equipment UE (hard handover or FCS) allows a higher data transfer rate to be achieved than has previously been possible.

With regard to the method for the transmission of data packets from a first transmission station to a mobile receiver station in a mobile radio system, a connection is established between the first transmission station and the receiver station by way of a second transmission station and first data packets are sent from the first transmission station to the second transmission station for transmission to the receiver station. Information relating to those first data packets which have not been successfully transmitted by way of the second transmission station to the receiver station is determined in the second transmission station and/or the receiver station. This information thus provides status information for the data transmission. A handover of the connection to a third transmission station takes place and after the handover of the connection second data packets are sent from the first transmission station to the third transmission station and transmitted from there to the receiver station. The information relating to those first data packets which have not been successfully transmitted by way of the second transmission station to the receiver station is sent to the first transmission station and/or the third transmission station only after transmission of the second data packets. This method makes it possible in the event of a switch of connection, as occurs as a result of a handover or a fast cell selection process, to transmit data packets immediately without the third transmission station and/or the first transmission station having knowledge of the success or lack of success in relation to previously transmitted data packets, in other words has at its disposal the data transmission status information ascertained from the second transmission station and/or the receiver station. The method is able to guarantee higher data transfer rates in the event of a switch of connection than is possible when prior to the resumption of the data transmission the data transmission status information is first sent from the second transmission station to the third transmission station and/or the first transmission station. In particular, this method is suitable for data transmissions having high data transfer rates such as High Speed Downlink Packet Access (HSDPA).

In a first embodiment, the method is implemented in a cellular mobile radio system. In this case, the first transmission station is a controller, the second and third transmission stations are base stations and the receiver station is a user equipment.

A second embodiment implements the method in an ad-hoc network (also known as self-organizing network). In an ad-hoc network, in other words a communication network which can also be formed exclusively using mobile stations, the first transmission station is a mobile station or an access station. In this situation, an access station is understood to be a fixed station which allows access to the fixed network. The second and third transmission stations and also the receiver station are mobile stations.

By preference, the second data packets do not match any of the first data packets. This course of action serves to ensure that no data packets are transmitted more than once. This again increases the data transfer rate during the switch of connection.

In an alternative embodiment, the second data packets match those of the first data packets which although sent from the first transmission station to the second transmission station have however no longer been transmitted from the second transmission station to the receiver station prior to handover of the connection. When using this embodiment, data packets which the user equipment should already have received during the data transmission by the first transmission station are transmitted immediately on handover of the connection. These data packets then reach the user equipment for the first time and this happens before the third transmission station is aware of the status of the data transmission. The data transfer rate is thus increased for its part.

It is advantageous to determine on the basis of the probable duration of transmission from the first transmission station to the second transmission station or to the receiver station those of the first data packets which although sent from the first transmission station to the second transmission station have however no longer been transmitted from the second transmission station to the receiver station prior to handover of the connection. On the basis of the probable duration of transmission, in other words on the basis of the time which a data packet requires in order to be received by the second transmission station or by the receiver station after being sent by the first transmission station, the first transmission station can specify which data packets were never able to reach the receiver station although they were sent by the first transmission station before the switch of connection was carried out. These data packets can then be transmitted by the third transmission station without this transmission station having data transmission status information.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIGS. 3 to 7 show the manner of execution of data transmission during a switch in connection, and FIG. 8 shows a different embodiment of the mobile radio system according to one embodiment of the invention, in the form of an ad-hoc network.

The invention will be described in the following with reference to a UMTS. The invention can naturally also be used for other mobile radio systems. This applies in particular to GSM, ad-hoc networks (see FIG. 8) and 4th generation mobile radio systems.

Figure 1:
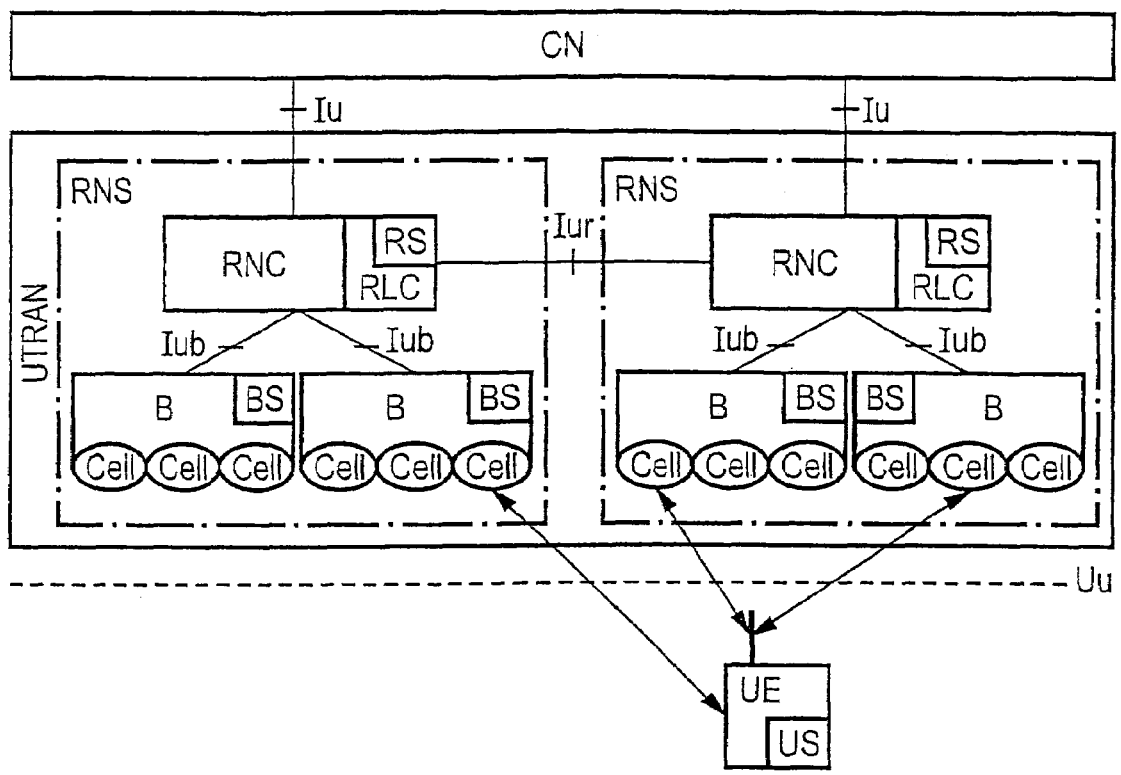
FIG. 1 shows a UMTS according to the related art.
Figure 2:
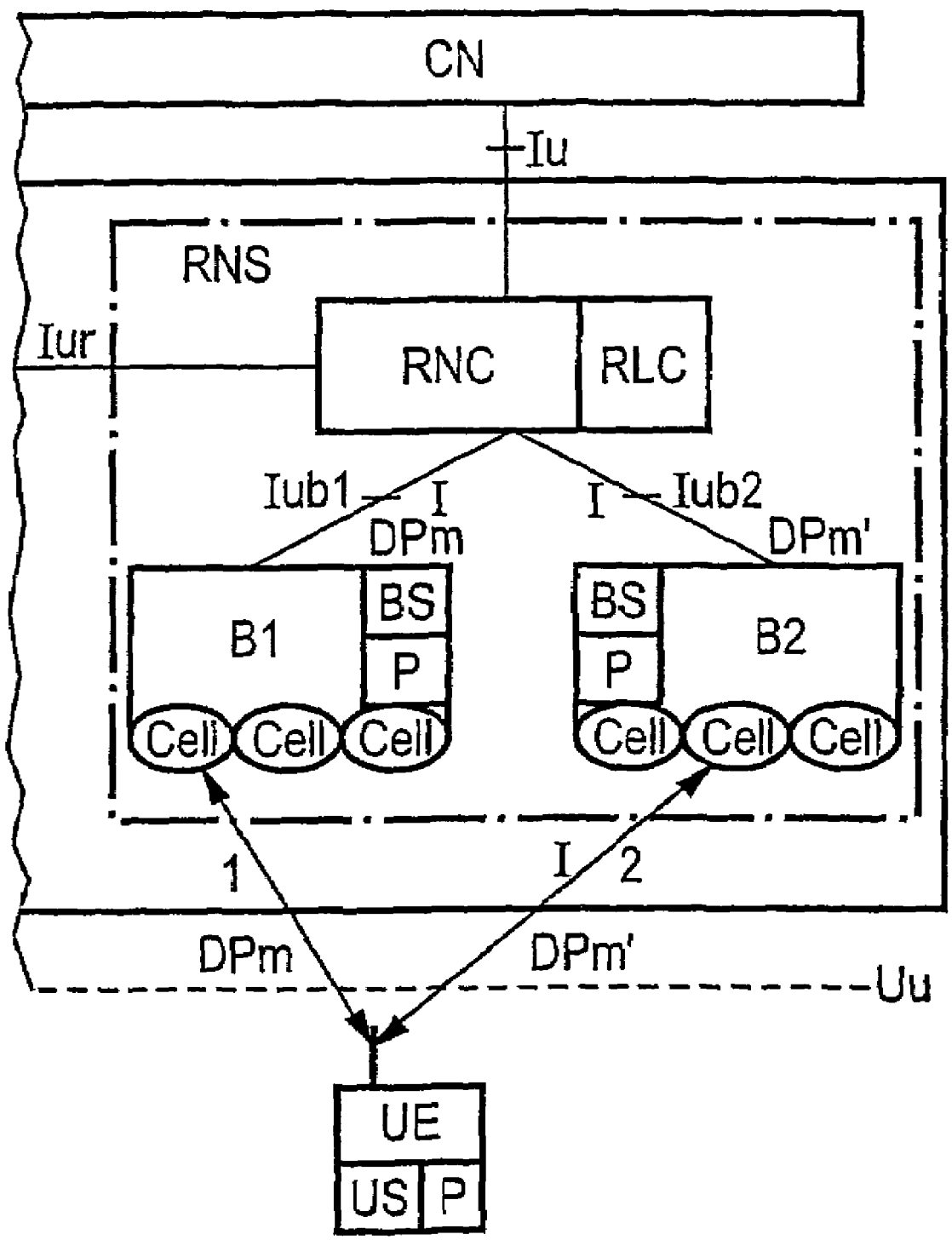
FIG. 2 shows a section of a cellular mobile radio system according to one embodiment of the invention.

The same reference characters in FIGS. 1 and 2 denote the same objects.

The section of a UTMS illustrated in FIG. 2 shows a first, a second and a third transmission station represented by a controller RNC, a first base station B1 and a second base station B2. A connection exists between a receiver station taking the form of a user equipment UE and the first base station B1 by way of a transmission path 1. First data packets DPm are transmitted over this connection from the fixed network CN by the interfaces Iu and Iub1 to the user equipment UE. The controller RNC has a storage facility RS. The base stations B1, B2 having storage facilities BS and the user equipment UE having a storage facility US have a processor P which is used to determine the information I described below. The storage facilities RS, BS, US are used for storing data packets and information relating to the data transmission status for each data packet.

In the first base station B1 the data packets DPm sent by the controller RNC are stored in the storage facility BS and transmitted from there to the user equipment UE. In this situation, in the first base station B1 and in the user equipment UE the information I that specifies which of the first data packets DPm have not been successfully transmitted by way of the first base station B1 to the user equipment UE is determined by the processor P. This information I thus specifies for which of the first data packets DPm a NACK signal has been sent by the user equipment UE to the first base station B1 and which of the first data packets DPm have not yet been transmitted to the user equipment UE although they have been transmitted by the controller RNC to the first base station B1. The controller RNC can ascertain on the basis of the contents of its storage facility RS which data packets it has already sent to the first base station B1 and which data packets it has not yet sent to the first base station B1.

If the connection quality of the connection over the transmission path 1 falls below a minimum level while a better connection quality is possible at the same time for a potential transmission path 2 by way of the second base station B2, then a switch in transmission path takes place, in other words the connection is handed over from the first base station B1 to the second base station B2. Immediately after this handover, second data packets DPm' are already being sent by the controller RNC to the second base station B2 and transmitted from there to the user equipment UE. These second data packets DPm' have not been previously sent to the first base station B1. The controller RNC can ensure that this happens in that, on the basis of the transmission status of its storage facility RS, it sends only second data packets DPm' having identification numbers m' from its storage facility RS which it has not previously sent to the first base station B1. In this manner, a data transmission to the user equipment UE is already enabled again immediately after the handover. Only after or during the transmission of these second data packets DPm' to the user equipment UE is the second base station B2 informed about those of the first data packets DPm which have previously not been successfully transmitted by way of the first base station B1 to the user equipment UE, in other words for which the user equipment UE has sent a NACK signal to the first base station B1, or which have been stored in the first base station B1 but have not yet been transmitted to the user equipment UE. To this end, this information I is sent by the user equipment UE by way of the air interface and by the first base station B1 by way of the interfaces Iub1 and Iub2 to the second base station B2. After the information I has been sent and the data packets designated by the information I have been transmitted at the same time by way of the interfaces Iub1 and Iub2, the data transmission of these data packets is performed subsequently and the mobile radio system resumes the normal data transmission.

The timing sequence of the data transmission before and shortly after the connection handover from the first base station B1 to the second base station B2 is described in FIGS. 3 to 7. The tables show the contents of the storage facilities RS, BS, US of the stations involved at different points in time. The first column (new) for the storage facility RS of the controller RNC lists identification numbers of those data packets which the controller RNC has received from the fixed network CN but has not yet sent to the storage facility BS of the first base station B1 or of the second base station B2. The first column (new) for the storage facility BS of the first base station B1 and of the second base station B2 in each case contains identification numbers of those data packets which have been received by the controller RNC but have not yet been sent to the user equipment UE. The second column (sent) for the storage facilities RS, BS in each case gives the identification numbers of data packets which have already been sent, while the third column (retrans) contains identification numbers of data packets which have been re-transmitted following a NACK signal. In the storage facility US for the user equipment UE, the first column (ACK) indicates which data packets have been successfully decoded, while the second column (NACK) contains those identification numbers whose associated data packets could not be successfully decoded and for which a re-transmission is requested. In the following, the specification "data packet n" denotes the data packet having the identification number n.

According to FIG. 3, during the connection using transmission path 1 the controller RNC initially sends data packets 1 to 4 (sent) as first data packets DPm (cf. FIG. 2) to the first base station B1. Further data packets 5 to 9 (new) are still contained in the queue and are waiting to be sent. The first base station B1 has already transmitted data packets 1 to 3 (sent), while although data packet 4 has been received it has not yet been transmitted to the user equipment UE. The user equipment UE has successfully decoded data packets 1 and 3 (ACK), but data packet 2 has not been received successfully (NACK) and a re-transmission is requested.

In order to give a better overview, a further transmission of new data packets parallel to the updating of the storage contents is not always shown in the following figures. This parallel transmission is possible, however.

In FIG. 4, the storage facility RS for the controller RNC remains unchanged. After the transmission of ACK signals and NACK signals from the user equipment UE to the base station B1, the data packet 4 still remains available for transmission in the first base station B1, but has not yet been sent. The base station B1 is then informed about the fact that the data packet 2 needs to be re-transmitted (retrans). This data packet 2 has not yet been successfully received by the user equipment UE, with the result that the status "NACK" remains stored for this data packet. The information relating to the status "ACK" for the data packets 1 and 3 is no longer required and has been deleted in the meantime.

If the handover takes place in this state, this then results in the situation shown in FIG. 5. The storage facilities of the first base station B1 and of the user equipment UE remain unchanged. However, new data packets 5 to 7 (sent) are already being sent by the controller RNC as second data packets DPm' (cf. FIG. 2) to the second base station B2 (see there in the first column). The question marks in the columns of the second base station B2 indicate that the second base station B2 has no information whatsoever at this point in time relating to the manner of execution of the previous transmission (transmission path 1 in FIG. 2).

Figure 6:
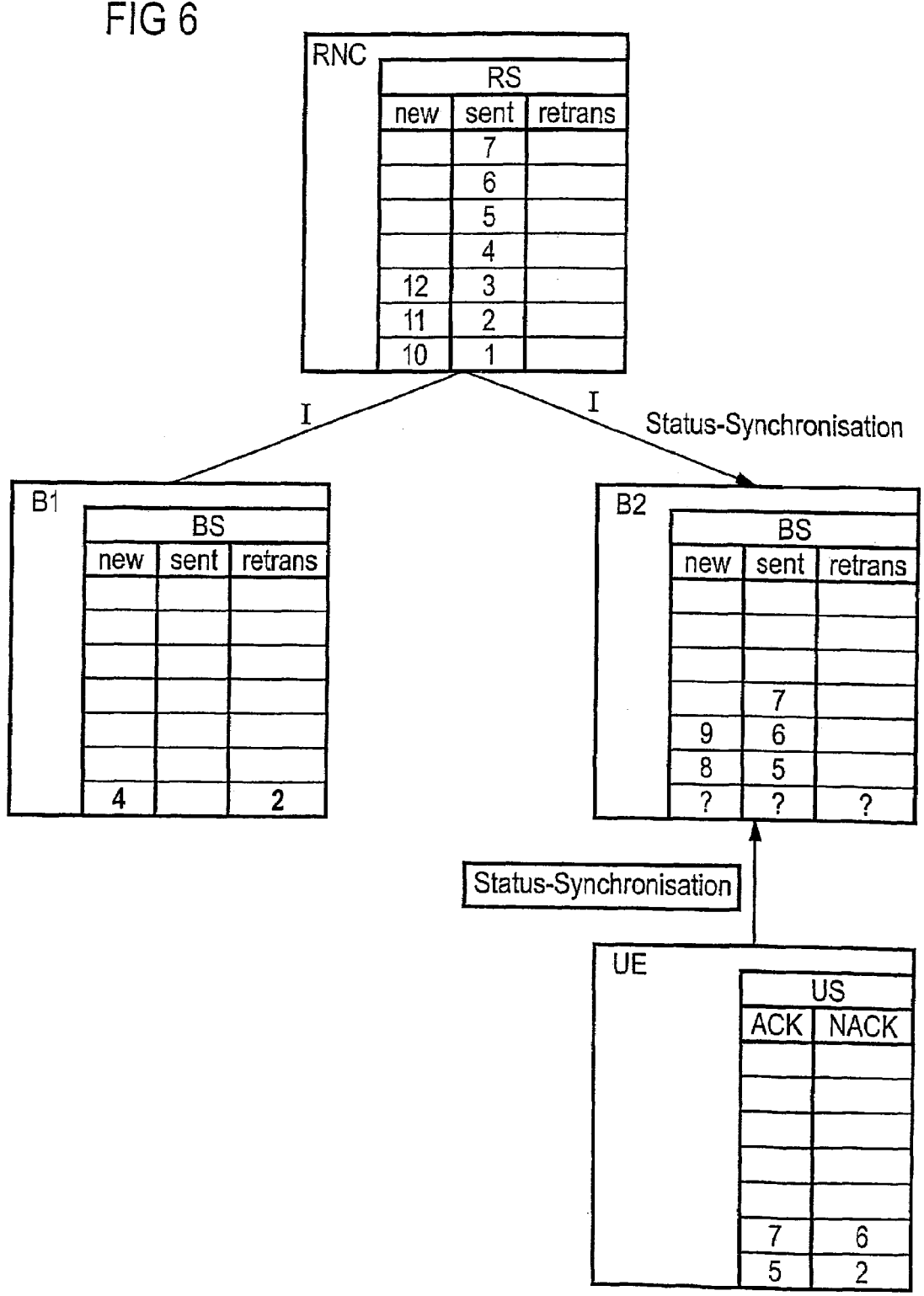

In FIG. 6, a transmission of the data packets 5 to 7 (sent) is then already performed by the second base station B2, while at the same time or following this transmission the storage facilities of the first base station B1 and of the user equipment UE are synchronized with the second base station B2 (status synchronization). During the status synchronization, both the data transmission status information stored as information I in the storage facility BS of the first base station B1 is synchronized and the necessary data packets are also transmitted. In this example the data packets 2 and 4 as well as the associated status information (information I) are therefore transmitted during the status synchronization. In this situation, the storage facility of the user equipment UE naturally already contains information relating to the success in transmitting the data packets 5 to 7, in addition to the status information which is still stored there for data packet 2.

After the updating of the storage facility of the second base station B2, the storage status of the first base station B1 (see FIG. 7) is accordingly contained therein, in other words the data packet 4 in the first column and the data packet 2 in the third column. Similarly, the third column contains the data packet 6 for which the user equipment UE has requested a re-transmission.

According to one aspect of the invention, first data packets 5 to 7 are thus initially transmitted by way of the second base station B2 before the status synchronization takes place. When compared with this, according to the related art the transmission of the data packets 5 to 7 would not take place until after the status synchronization.

The first base station B1 and the second base station B2 are assigned to only a single controller RNC in the embodiment illustrated. However, the method can also be applied to situations in which the first base station B1 and the second base station B2 belong to different controllers RNC (cf. FIG. 2). In this case, the interface Iur is additionally required during the status synchronization.

In a further embodiment, the controller RNC knows the probable transmission time for data packets to reach the first base station B1 or to reach the user equipment UE. It can thus calculate or estimate whether the data packet 4 could have been transmitted to the user equipment UE prior to the handover. If the result is that a transmission, as can be seen from FIG. 5 for the data packet 4, was unable to take place prior to the handover, then the controller RNC can naturally actually send the data packet 4 together with the data packets 5 to 7 and thus additionally increases the data transfer rate during the switch of connection. This case is represented by the digit 4 within parentheses in the storage facility BS of the second base station B2. The controller RNC can determine the probable transmission time from the maximum data transfer rate for the transmission of the first data packets DPm from the first base station B1 to the user equipment UE and from the delay in sending the first data packets DPm from the controller RNC to the first base station B1. The delay in sending to the first base station B1 is known to the controller RNC as a result of the previous send process and can be approximately 10 to 100 milliseconds. In this situation, large delay times are obtained in particular in cases when the interface Iur is required for sending data packets, in other words when different controllers RNC are involved in the data transmission. For example, if a probable transmission time of 100 milliseconds results, then the controller RNC can assume that data packets which it has sent to the first base station B1 80 milliseconds (100 milliseconds less a safety margin of 20 milliseconds in this example) prior to the handover were no longer able to be transmitted to the user equipment UE. The controller RNC can send these data packets together with data packets which have not yet been sent to the first base station B1 immediately to the second base station B2.

The method can also be used in an ad-hoc network, as is represented in FIG. 8. In this case, the first data packets DPm are either sent from a first mobile station MS1 or an access station ZS to a second mobile station MS2 and transmitted from there to a further mobile station MS4 as a receiver station. The second data packets DPm' are sent to a third mobile station MS3 and transmitted from there to the further mobile station MS4. With regard to an access station, this is a fixed station which—in similar fashion to the controller RNC in UMTS—grants the user stations of an ad-hoc network access to the fixed network CN. Mobile stations MSi each have a storage facility S for data packets and data transmission status information and a processor P for determining the information I. Apart from different designations for the transmission stations and the receiver station, the manner of execution of the method in an ad-hoc network, as is represented in FIG. 8, is identical to the embodiment described previously with reference to a cellular system (FIGS. 2 to 7).

The invention has been described in detail with particular reference to preferred embodiments thereof and examples, but it will be understood that variations and modifications can be effected within the spirit and scope of the invention.

The invention claimed is:

1. A method for the transmission of data packets from a first transmission station to a mobile receiver station in a mobile radio system, comprising:
   establishing a connection between the first transmission station and the mobile receiver station by way of a second transmission station,
   sending first data packets from the first transmission station to the second transmission station for transmission from the second transmission station to the mobile receiver station,
   determining information relating to first data packets which were not successfully transmitted to the mobile receiver station, the information being determined in the second transmission station and/or the mobile receiver station,
   performing a handover of the connection from the second transmission station to a third transmission station,
   after the handover of the connection, transmitting second data packets from the first transmission station to the mobile receiver station via the third transmission station, and
   sending the information to the first transmission station and/or the third transmission station only after second data packets are transmitted.

2. The method according to claim 1, wherein
   the method is implemented in a cellular mobile radio system,
   the first transmission station is a controller,
   the second and third transmission stations are base stations, and
   the mobile receiver station is a user equipment.

3. The method according to claim 1, wherein
   the method is implemented in an ad-hoc network,
   the first transmission station is a mobile station or an access station, and
   the second and third transmission stations are mobile stations.

4. The method according to claim 1, wherein the second data packets do not match any of the first data packets.

5. The method according to claim 1, wherein
the handover occurs before all of the first packets are transmitted from the second transmission station to the mobile receiver station, thereby leaving remaining first packets;
the second data packets include data packets that match the remaining first data packets.

6. The method according to claim 5, wherein the remaining first data packets are not successfully transmitted from the second transmission station to the mobile receiver station after the handover.

7. The method according to claim 5, wherein
the remaining first data packets are identified on the basis of a probable duration of transmission from the first transmission station to the second transmission station or from the first transmission station to the mobile receiver station, and
after identification, the remaining first data packets are sent to the mobile receiver station as second data packets.

8. The method according to claim 7, wherein the remaining first data packets are identified in the first transmission station.

9. The method according to claim 1, further comprising successfully receiving pre-handover packets at the mobile receiver station, the pre-handover packets being sent from the first transmission station via the second transmission station.

10. The method according to claim 1, further comprising sending post-handover packets after sending the information, the post-handover packets being sent from the first transmission to the mobile receiver station via the third transmission station.

11. The method according to claim 1, wherein the handover is a hard handover.

12. The method according to claim 1, wherein the handover is part of a Fast Cell Selection process.

13. The method according to claim 1, wherein the first data packets which were not successfully transmitted to the mobile receiver station comprise:
packets that were transmitted to the second transmission station, but were not transmitted from the second transmission station to the mobile receiver station before the handover; and
packets for which the mobile receiver station has sent a NACK signal.

14. The method according to claim 3, wherein the second data packets do not match any of the first data packets.

15. The method according to claim 3, wherein
the handover occurs before all of the first packets are transmitted from the second transmission station to the mobile receiver station, thereby leaving remaining first packets;
the second data packets include data packets that match the remaining first data packets.

16. The method according to claim 15, wherein the remaining first data packets are not successfully transmitted from the second transmission station to the mobile receiver station after the handover.

17. The method according to claim 16, wherein
the remaining first data packets are identified on the basis of a probable duration of transmission from the first transmission station to the second transmission station or from the first transmission station to the mobile receiver station, and
after identification, the remaining first data packets are sent to the mobile receiver station as second data packets.

18. A mobile radio system, comprising:
a first transmission station;
a second transmission station to receive first data packets from the first transmission station;
a mobile receiver station to receive first data packets from the first transmission station via a connection through the second transmission station;
a third transmission station to receive second data packets after a handover of the connection from the second transmission station to the third transmission station, the second data packets being received from the first transmission station for transmission to the mobile receiver station;
a checking unit to determine information about first data packets that were not successfully transmitted to the mobile receiver station by way of the second transmission station, the checking unit being provided in the second transmission station and/or the mobile receiver station; and
an information send unit to send the information to the first transmission station and/or the third transmission station only after the handover of the connection to the third transmission station has taken place and second data packets have been sent from the first transmission station to the third transmission station.

19. The system according to claim 18, wherein the information send unit sends the information only after the second data packets have been transmitted from the third transmission station to the mobile receiver station.

20. The system according to claim 18, wherein pre-handover packets are successfully received at the mobile receiver station, the pre-handover packets being sent from the first transmission station via the second transmission station.

21. The system according to claim 18, wherein post-handover packets are sent after sending the information, the post-handover packets being sent from the first transmission to the mobile receiver station via the third transmission station.

22. The system according to claim 18, wherein the handover is a hard handover.

23. The system according to claim 18, wherein the handover is part of a Fast Cell Selection process.

24. The system according to claim 18, wherein the first data packets which that not successfully transmitted to the mobile receiver station comprise:
packets that were transmitted to the second transmission station, but were not transmitted from the second transmission station to the mobile receiver station before the handover;
packets for which the mobile receiver station has sent a NACK signal.

25. The system according to claim 18, wherein
the first transmission station is a controller,
the second and third transmission stations are base stations, and
the mobile receiver station is a user equipment.

26. The system according to claim 18, wherein
the system is part of an ad-hoc network,
the first transmission station is a mobile station or an access station, and
the second and third transmission stations are mobile stations.

27. The system according to claim 18, wherein the second data packets do not match any of the first data packets.

28. The system according to claim 18, wherein
the handover occurs before all of the first packets are transmitted from the second transmission station to the mobile receiver station, thereby leaving remaining first packets;
the second data packets include data packets that match the remaining first data packets.

29. The system according to claim 28, wherein the remaining first data packets are not successfully transmitted from the second transmission station to the mobile receiver station after the handover.

30. The system according to claim 18, wherein
the remaining first data packets are identified on the basis of a probable duration of transmission from the first transmission station to the second transmission station or from the first transmission station to the mobile receiver station, and
after identification, the remaining first data packets are sent to the mobile receiver station as second data packets.

31. The system according to claim 30, wherein the remaining first data packets are identified in the first transmission station.

* * * * *

UNITED STATES PATENT AND TRADEMARK OFFICE
CERTIFICATE OF CORRECTION

PATENT NO. : 7,627,317 B2
APPLICATION NO. : 10/493112
DATED : December 1, 2009
INVENTOR(S) : Fariba Raji et al.

It is certified that error appears in the above-identified patent and that said Letters Patent is hereby corrected as shown below:

Title Page, Item (75) (Inventors), Line 1, change "Faiba" to --Fariba--.

Title Page, Item (73) (Assignee), Line 1, change "Akiengesellschaft," to --Aktiengesellschaft,--.

Column 10, Line 44, change "packets which that" to --packets which were--.

Signed and Sealed this

Ninth Day of March, 2010

David J. Kappos
*Director of the United States Patent and Trademark Office*